United States Patent
Nordström et al.

(10) Patent No.: US 8,443,443 B2
(45) Date of Patent: May 14, 2013

(54) SECURITY SYSTEM AND METHOD FOR DETECTING INTRUSION IN A COMPUTERIZED SYSTEM

(75) Inventors: Peder Nordström, Luleå (SE); Jonas Johansson, Järfälla (SE)

(73) Assignee: Behaviometrics AB, Lulea (SE)

( * ) Notice: Subject to any disclaimer, the term of this patent is extended or adjusted under 35 U.S.C. 154(b) by 688 days.

(21) Appl. No.: 12/444,265

(22) PCT Filed: Oct. 4, 2007

(86) PCT No.: PCT/SE2007/000886
§ 371 (c)(1), (2), (4) Date: Jan. 26, 2010

(87) PCT Pub. No.: WO2008/041915
PCT Pub. Date: Apr. 10, 2008

(65) Prior Publication Data
US 2010/0146622 A1      Jun. 10, 2010

Related U.S. Application Data

(60) Provisional application No. 60/828,071, filed on Oct. 4, 2006.

(30) Foreign Application Priority Data

Oct. 4, 2006    (SE) ...................................... 0602074

(51) Int. Cl.
    *G06F 21/00* (2006.01)
(52) U.S. Cl.
    USPC ............................................. 726/23; 726/22
(58) Field of Classification Search .............. 726/9, 26, 726/27, 28, 29, 22; 713/224, 201, 212, 218, 713/220, 223; 709/204, 201, 220, 227; 380/200, 380/201, 202, 203, 277
See application file for complete search history.

(56) References Cited

U.S. PATENT DOCUMENTS

| | | |
|---|---|---|
| 5,557,686 A | 9/1996 | Brown et al. |
| 5,991,881 A | 11/1999 | Conklin et al. |
| 6,442,692 B1 | 8/2002 | Zilberman |

(Continued)

FOREIGN PATENT DOCUMENTS

| | | |
|---|---|---|
| DE | 196 31 484 C1 | 3/1998 |
| GB | 2 387 681 A | 10/2003 |

(Continued)

OTHER PUBLICATIONS

Extended European Search Report issued in corresponding International Application No. PCT/SE2007/000886 completed Apr. 7, 2011.

(Continued)

*Primary Examiner* — Brandon Hoffman
*Assistant Examiner* — Nega Woldemariam
(74) *Attorney, Agent, or Firm* — Dentons US LLP

(57) ABSTRACT

In detecting the identity of a person currently using a computer (100) and in particular for detecting whether the person is the intended or authorized user of the computer previously established user patterns of users as stored in a database (4) are matched, in comparators (9), with data of the person's interactions through the computer. The interactions are detected by a monitoring module (2) that in testing modules (7) can process data of the interactions and storing them in buffers (8) to be used by the comparators. Such data can include data of interactions that happen directly after each other and can also include one or more time characteristic of each detected interaction.

26 Claims, 2 Drawing Sheets

U.S. PATENT DOCUMENTS

| | | |
|---|---|---|
| 2003/0191594 A1 | 10/2003 | Kondo et al. |
| 2004/0187037 A1 | 9/2004 | Checco |
| 2004/0221171 A1 | 11/2004 | Ahmed et al. |
| 2006/0224898 A1* | 10/2006 | Ahmed ........................ 713/186 |
| 2007/0055766 A1* | 3/2007 | Petropoulakis et al. ...... 709/224 |

FOREIGN PATENT DOCUMENTS

| | | |
|---|---|---|
| WO | 97/23816 A1 | 7/1997 |
| WO | 97/37450 A1 | 10/1997 |
| WO | 00/54458 A1 | 9/2000 |
| WO | 01/31420 A2 | 5/2001 |
| WO | 2005/059720 A1 | 6/2005 |

OTHER PUBLICATIONS

European Patent Office Communication in corresponding European Patent Application No. 07835088.1 dated Dec. 14, 2011.

* cited by examiner

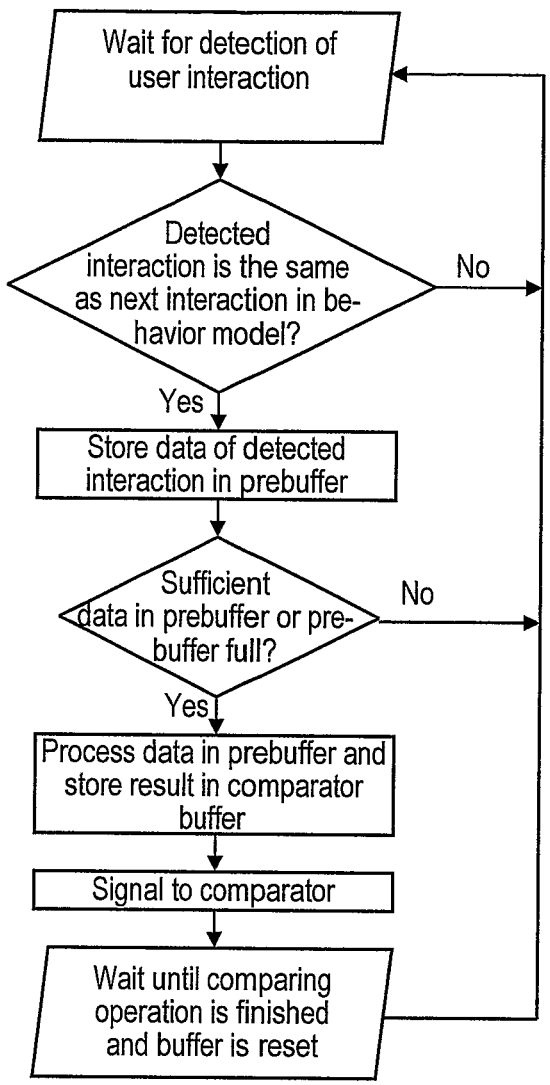

SECURITY SYSTEM AND METHOD FOR DETECTING INTRUSION IN A COMPUTERIZED SYSTEM

RELATED APPLICATIONS

This application claims priority and benefit from Swedish patent application No. 0602074-7, filed Oct. 4, 2006, the entire teachings of which are incorporated herein by reference.

TECHNICAL FIELD

The present invention relates to the field of computer network security. More specifically, it relates to methods and systems for detecting and evaluating user activity in a computerized system for detecting intrusion.

BACKGROUND

Computer network security is an important issue for all types of organizations and companies. Computer break-ins and their misuse have become common features. The number, as well as the sophistication, of attacks on computer systems are on the rise. Often, computer system intruders have overcome password authentication mechanism designed to protect the system.

As the number of users within a particular entity grows, the risk of unauthorized intrusions into computer systems or into certain sensitive components of large computer systems increases. In order to maintain a reliable and secure computer system or network, regardless of the size thereof, exposure to potential network intrusions must be reduced as much as possible. Intrusions to computer system can originate from legitimate users within an entity attempting to access secure portions of the network or can originate from illegitimate users outside an entity attempting to break into the network of the entity, such illegitimate users often referred to as hackers. Intrusion from either of these two groups of users can be damaging to the computer system or network of an organization. Most attempted security violations are internal, such as attempted by employees of a company or an organization.

One approach to detecting computer system intrusion is to calculate features based on various factors, such as command sequences, user activity, machine usage loads, resource violations, files accessed, data transferred, terminal activity, network activity, among others. Features are then used as input to a model or expert system or similar system which determines whether a possible intrusion or violation has occurred. The use of features is well-known in various fields in computer science including the field of computer network security, especially in conjunction with an expert system which evaluates the feature values. Features used in present computer security systems are generally rule-based features. Such features lead to computer security systems that are inflexible, highly complex, and require frequent upgrading and maintenance. A common problem associated with previously known security systems and available methods is that they require substantial CPU and calculating capacity.

Previously known security systems, such as those based on expert systems, that use such features generally use thresholds, for instance if-then-else clauses and case statements, to determine whether an intrusion has occurred. Thus, a human expert with an extensive knowledge of the computer network domain has to accurately determine, assign and, even more bothering, regularly update such thresholds for the system to be effective. A reliable computer system must be capable of accurately determining when a possible intrusion is occurring, and of doing so by taking into account trends in user activity. Further, a security feature of a computer system must be efficient from a resource handling point of view. Otherwise, such a security feature might be forced to be turned off due to the resulting high load of the computer system.

As mentioned above, rule-based features can also be used as input to a model instead of an expert system. However, a model that can accept only rule-based features and cannot be trained to adjust to trends and changing needs in a computer network generally suffers from the same drawbacks as the expert system configuration. A model is generally used together with a features generator and accepts as input a features list. However, models generally used in computer network intrusion systems are not trained to take in account changing requirements and user trends in a computer network. Such models lead to computer security systems that are inflexible, complex and require frequent upgrading and maintenance.

A feature component of a complete network security system may have three general components: user activity, rule based system, and alert messages. User activity contain raw data, typically including aggregated log files and is raw in the sense that it is typically unmodified or has not gone through significant preprocessing. User activity has records of actions taken by users on the computer system that the organization or company wants to monitor.

The rule based system, such as an expert system, accepts input data from user activity files which acts as features in present security systems. As mentioned above, the rule based system, processes the input features and determines, based on rules, whether an intrusion has occurred or whether there is anomalous activity. In two simple examples, the rule based system can contain a rule instructing it to issue an alert message if a user attempts to write to a restricted file more than once.

An alert message is issued if a rule threshold is exceeded to inform a network security analyst that a possible intrusion may be occurring. Typically, alert message contains a score and a reason for the alert, such as which rules or thresholds were violated by a user. As stated above, these thresholds can be outdated if circumstances change in the system. For example, circumstances can change and the restricted file can be accessible to a larger group of users. In this case an expert would have to modify the rules in the rule based system.

As mentioned above, the feature and rule based systems and conventional models used in conjunction with these components have significant drawbacks. One is the cumbersome and overly complex set of rules and thresholds that must be entered and maintained to cover all the possible security violations. Another is the knowledge that an expert must have in order to update or modify the rule base and the model to reflect changing circumstances in the organization. A major drawback of such systems is that if a user fulfils the rules, a user session is considered to be made by an authorized user, even if the logged-in user is not the real world user that is associated with the authorization. Such a situation may occur if the authorized user leaves a switched-on computer during a lunch break. In such case the on-going authorized session may be taken over by another user performing an attempt to access classified information. Such user actions may very well fulfill the rules of the system, and hence the intrusion passes undetected. Another scenario is that an un-authorized user gets access to log-in details of an authorized user. Possibly the intrusion might be detected at a later stage, but then the damage to the company or the organization has already occurred. Another significant drawback is the high load that such systems cause to the monitored computer system.

An example of an approach using a neural network is disclosed in the published International patent application WO 01/31421. In order to detect harmful or illegal intrusions into a computer network or into restricted portions of a computer network a process is used for synthesizing anomalous data to be used in training a neural network-based model for use in a computer network intrusion detection system. The base for the profile relates to events such as login procedures or file accesses. The CPU load is also taken into account. The system detects anomalous behavior. A remaining problem is that does not consider the behavior of the users.

The published International patent application WO 00/54458 discloses a computer-implemented intrusion detection system and method that monitor a computer system in real-time for activity indicative of attempted or actual access by unauthorized persons or computers. The system detects unauthorized users attempting to enter into a computer system by comparing user behavior to a user profile. A remaining problem is that the disclosed method and system does not describe how to monitor and compare a known behavior of an authorized user to the behavior of the individual during a session. Rather the disclosed system and method focus on events around a log-in procedure.

SUMMARY

It is an object of the invention to provide an efficient system and an efficient method for detecting, in a computerized system, the intrusion of a person different from a person associated with an authorized user's account.

The system and method aim at matching previously established user behavior, stored in a behavior profile associated with the authorized user, with a data stream caused by user interaction of the person using the authorized user's account, evaluating similarities between previously established patterns of the authorized user with events and sequences in an on-going session and detecting if the person is the logged-in user or another person different from the person associated with the authorized user and in such case causing an intrusion message.

Using the system and method as described herein it may be possible, at least in some case, to stop intrusions while they are happening, since the system and method can work in real time and analyze user activities directly after they are happening.

An advantage may be that the system and method as described herein may, at least in some cases, more efficiently than previously known technology for intrusion detection detect intrusions independent of user authorization schemes and firewalls. An example is a scenario where a non authorized user gets access to log-in details of an authorized user. Another example of an intrusion that the invention aims at detecting is when the individual associated with the authorized user leaves his/hers workplace for lunch break and forgets to log out. An individual being a non authorized user may then access sensitive information to which the authorized user has privilege to access.

The system and method typically evaluate and detect intrusion in a computerized system in a continuous manner during a user session. At log-on to the computerized system of a person individual, such as a log-on to a personal computer in an Intranet environment, a session of the system starts. The session typically ends as the user logs off from the computerized system. In contrast to some previous known intrusion detection systems the system and method do not focus on events relating to the log-in of users. Rather the system and method allow a continuous supervision of a computerized system.

As a person logs on to a computing environment the person is identified as a logged-in user. The logged-in user is in the system ad method handled as a person who may be or may not be the person authorized to be the logged-in user. The security system may e.g. comprise a monitoring module, a comparing module and a validator, which are configured to evaluate events related to the authorized user's behavior. Details of a user behavior may e.g. include the start of certain programs and a sequence of commands preceding the start of a program. The comparing module tries to match previous established behaviors with the current activity of the logged-in user.

Hence generally, in the method and system a user interacting with or through a computer or similar device can be used to identify the user or at least to detect whether a current user is or is not the same as the intended, user of the computer.

The method may specifically include the following steps:
all the time or continuously detecting interactions or activities of a user with or through a computer or a similar device,
directly, after having detected an interaction or an activity, analyzing the interaction or activity to decide, where also recorded data of a previously detected activity or interaction may be considered, whether the detected interaction or activity belongs to a predetermined model of user behavior,
in the case where it is decided that the interaction or activity belongs to the predetermined model, storing data of the interaction or activity in a buffer associated with said predetermined model,
analyzing the data stored in the buffer to find whether sufficient data are stored in the buffer, or whether the buffer is full in the case where the buffer has a predetermined length,
in the case where it is decided that there are sufficient data stored in the buffer or the buffer is full, using the data stored in the buffer for comparing to data in a behavior profile of a user, and
in the case where the result of the comparing is that the data stored in the buffer does not sufficiently agree with said data in the behavior profile, signal or indicate this result to give an alarm or use the result for an evaluation or validation whether the current user is or is not the same as the intended user or use the result for identifying the current user, and otherwise to discard the data stored in said buffer.

A corresponding system may comprise
a monitoring module for all the time or continuously detecting interactions or activities of the user with or through the computer or similar device,
at least one testing module connected to the monitoring module for directly, after the monitoring module has detected an interaction or an activity, analyzing the interaction or activity, the at least one testing module arranged to then for decide, in particular also considering recorded data of a previously detected activity or interaction, whether the detected interaction or activity belongs to a predetermined model of user behavior,
a buffer connected to the at least one testing module for storing, in the case where the at least one testing module has decided that the detected interaction or activity belongs to the predetermined model, data of the detected interaction or activity,
the at least one testing module further arranged to analyze the data stored in the buffer to find whether sufficient data are stored-in the buffer, or whether the buffer is full in the case where the buffer has a predetermined length, a comparator connected to said at least one testing module and the buffer for using, in the case where the at least one testing module has decided that there are sufficient data stored in the buffer or the buffer is full, the data stored in the buffer for comparing to data in a behavior profile of a user, and the comparator further arranged to signal or indicate, in the case where the result of the comparing by the comparator is that the data stored in the buffer does not sufficiently agree with or is not sufficiently in line with said data in the behavior profile, this result to give an alarm, or provide the result for an evaluation or validation whether the current user is or is not the same as the intended user or use the result for identifying the current user, and otherwise to discard the data stored in said buffer.

The data recorded for a detected interaction or user activity may e.g. include a time characteristic of the detected interaction or activity, such as the time when the detected interaction or activity occurred or was detected or the time interval between the detected interaction or activity and the time of a previously detected interaction or activity for which data are already stored in the buffer.

In one special embodiment the interaction of a user with or through a computer can be used to continuously identify the user or at least to detect whether a current user is or is not the same as the intended user of the computer.

In another embodiment, which can be combined with any of the previous embodiments, a method and a system where a user interacts through a keyboard, a mouse and other input devices can be used to continuously identify the user or at least to detect whether a current user is or is not the same as the intended user of the computer.

In another embodiment, which can be combined with any of the previous embodiments, a method and a system are provided where a user profile containing historical data can be created and be stored on any computer readable medium.

In another embodiment, which can be combined with any of the previous embodiments, a method and a system are provided where a user interacting with a computer can be matched against many different user profiles to identify the user.

In another embodiment, which can be combined with any of the previous embodiments, a method and a system are provided where a user interacting with or through a computer can be traced by matching input against known historical user data.

In another embodiment, which can be combined with any of the previous embodiments, a method and a system are provided where a user interacting with or through a computer can be matched against a user profile associated with the user to determine if it is the correct user.

In another embodiment, which can be combined with any of the previous embodiments, a method and a system are provided where a user is associated with a user profile by an automatic selection.

In another embodiment, which can be combined with any of the previous embodiments, a method and a system are provided where a user is associated with a user profile by an account name.

In another embodiment, which can be combined with any of the previous embodiments, a method and a system are provided where a user is associated with a user profile by a manual selection.

In another embodiment, which can be combined with any of the previous embodiments, a method and a system are provided where timestamps for pressing and releasing keys on the keyboard can be used to determine user patterns in real time.

In another embodiment, which can be combined with any of the previous embodiments, a method and a system are provided where the timestamps for pressing and releasing keys on the keyboard are matched against a subset of the user profile to determine if the current user is the intended user.

In another embodiment, which can be combined with any of the previous embodiments, the difference in time between the respective key pressings are used as a representative of the user, the term "used as a representative of the user" herein taken to mean "used to detect whether a current user is or is not the same as the intended user of the computer".

In another embodiment, which can be combined with any of the previous embodiments, the time interval between key down and key down can be used as a representative of the user.

In another embodiment, which can be combined with any of the previous embodiments, the time interval between key down and key up can be used as a representative of the user.

In another embodiment, which can be combined with any of the previous embodiments, the time interval between key up and key down can be used as a representative of the user.

In another embodiment, which can be combined with any of the previous embodiments, the time interval between key up and key up can be used as a representative of the user.

In another embodiment, which can be combined with any of the previous embodiments, the idle time when pressing a button can be used as a representative of the user.

In another embodiment, which can be combined with any of the previous embodiments, the time interval between key down and key up on the same key can be used as a representative of the user.

In another embodiment, which can be combined with any of the previous embodiments, a sequence of keystrokes can be a representative of the user.

In another embodiment, which can be combined with any of the previous embodiments, time intervals between or derived from a sequence of keystrokes can be used as a representative of the user.

In another embodiment, which can be combined with any of the previous embodiments, the length of time for a whole sequence of key depressions can be used as a representative of the user.

In another embodiment, which can be combined with any of the previous embodiments, the time intervals between individual keystrokes can be used as a representative of the user.

In another embodiment, which can be combined with any of the previous embodiments, a method and a system are provided where usage of mouse input can be used to determine user patterns in real time.

In another embodiment, which can be combined with any of the previous embodiments, a method and a system are provided where the timestamps, clicks and movement from a computer mouse are matched against a subset of the user profile to determine if it is the current user is intended user.

In another embodiment, which can be combined with any of the previous embodiments, acceleration when moving a computer mouse can be used as a representative of the user.

In another embodiment, which can be combined with any of the previous embodiments, acceleration on the y-axis of a mouse cursor when moving a computer mouse can be used as a representative of the user.

In another embodiment, which can be combined with any of the previous embodiments, acceleration on the x-axis of a mouse cursor when moving a computer mouse can be used as a representative of the user.

In another embodiment, which can be combined with any of the previous embodiments, velocity when moving a computer mouse can be used as a representative of the user.

In another embodiment, which can be combined with any of the previous embodiments, velocity along the y-axis of a mouse cursor when moving a computer mouse can be used as a representative of the user.

In another embodiment, which can be combined with any of the previous embodiments, velocity along the x-axis of a mouse cursor when moving a computer mouse can be used as a representative of the user.

In another embodiment, which can be combined with any of the previous embodiments, an angle in which a mouse cursor is displaced when moving a computer mouse can be used as a representative of the user.

In another embodiment, which can be combined with any of the previous embodiments, a distance when moving a computer mouse can be used as a representative of the user.

In another embodiment, which can be combined with any of the previous embodiments, a displacement distance along the y-axis of a mouse cursor when moving a computer mouse can be used as a representative of the user.

In another embodiment, which can be combined with any of the previous embodiments, a displacement distance along the x-axis of a mouse cursor when moving a computer mouse can be used as a representative of the user.

In another embodiment, which can be combined with any of the previous embodiments, click statistics when moving and manipulating a computer mouse can be used as a representative of the user.

In another embodiment, which can be combined with any of the previous embodiments, characteristics of double click operations when using a computer mouse can be used as a representative of the user.

In another embodiment, which can be combined with any of the previous embodiments, a time interval or time intervals between clicks using a computer mouse can be used as a representative of the user.

In another embodiment, which can be combined with any of the previous embodiments, the idle time between pressing and releasing of a mouse button can be used as a representative of the user.

In another embodiment, which can be combined with any of the previous embodiments, the latency of the handling of a computer mouse can be used as a representative of the user.

In another embodiment, which can be combined with any of the previous embodiments, the time between a click and a movement of a mouse can be used as a representative of the user.

In another embodiment, which can be combined with any of the previous embodiments, the time between clicking on a left key of a mouse and a successive movement of the mouse can be used as a representative of the user.

In another embodiment, which can be combined with any of the previous embodiments, the time between clicking on a right key of a mouse and a successive movement of the mouse can be used as a representative of the user.

In another embodiment, which can be combined with any of the previous embodiments, the relationship between clicking operations, acceleration, velocity and angle when handling a computer mouse can be used as a representative of the user.

In another embodiment, which can be combined with any of the previous embodiments, the relationship movement between left button click (i.e. the acceleration and/or velocity) and right button click for a mouse can be used as a representative of the user.

In another embodiment, which can be combined with any of the previous embodiments, the relationship movement between left button click (i.e. the acceleration and/or velocity) and left button click when handling a mouse can be used as a representative of the user.

In another embodiment, which can be combined with any of the previous embodiments, the relationship movement between right button click (i.e. the acceleration and/or velocity) and right button click can be used as a representative of the user.

In another embodiment, which can be combined with any of the previous embodiments, the relationship movement between right button click (i.e. the acceleration and/or velocity) and right button click can be used as a representative of the user.

In another embodiment, which can be combined with any of the previous embodiments, the idle time when depressing a mouse button can be used as a representative of the user.

In another embodiment, which can be combined with any of the previous embodiments, drag and drop statistics when using a computer mouse for moving icons or similar objects on a display can be used as a representative of the user.

In another embodiment, which can be combined with any of the previous embodiments, a movement in combination with a button being pressed can be used as a representative of the user.

In another embodiment, which can be combined with any of the previous embodiments, the movement and interaction using a mouse can be illustrated as a usage grid that is taken as a representative of the user.

In another embodiment, which can be combined with any of the previous embodiments, the movement and interaction using a computer mouse can be illustrated as a topographic map representative of the user.

In another embodiment, which can be combined with any of the previous embodiments, the difference between a current path and a shortest path when moving a computer mouse can be used as a representative of the user.

In another embodiment, which can be combined with any of the previous embodiments, interpolation of screen values can be used as a grid for interaction using a computer mouse.

In another embodiment, which can be combined with any of the previous embodiments, interpolation can be used to make statistics independent of screen resolution.

In another embodiment, which can be combined with any of the previous embodiments, interactions made using a graphical user interface (GUI) can be used to identify a user or at least to detect whether a current user is or is not the same as the intended user of the computer.

In another embodiment, which can be combined with any of the previous embodiments, the way in which a user interacts through a graphical user interface to trigger an action in a computer or system can be used to determine if the current user is the intended user.

In another embodiment, which can be combined with any of the previous embodiments, the consequences of the user's actions using a graphical user interface can be used to determine if it the current user is the intended user.

In another embodiment, which can be combined with any of the previous embodiments, single interactions made using a graphical user interface can be used as a representative of the user.

In another embodiment, which can be combined with any of the previous embodiments, timestamps of interactions or simple user activities can be used to determine if the current user is the intended user.

In another embodiment, which can be combined with any of the previous embodiments, multiple single interactions considered as a sequence made using a graphical user interface can be used to as a representative of the user.

In another embodiment, which can be combined with any of the previous embodiments, the way in which a user gets from point A to point B can be used to determine if the current user is the intended user.

In another embodiment, which can be combined with any of the previous embodiments, matching between current data and data in a user profile, also called behavior profile, can be used to determine if the current user is the intended user.

In another embodiment, which can be combined with any of the previous embodiments, a hypothesis test when comparing data of interactions of a current user to data in a user profile can be used to determine if the current user is the intended user.

In another embodiment, which can be combined with any of the previous embodiments, the use of confidential intervals can be used to measure the hypothesis test to determine if the current user is the intended user.

In another embodiment, which can be combined with any of the previous embodiments, calculating an angle between two vectors that include characteristics of user behavior can be used to determine if the current user is the intended user.

In another embodiment, which can be combined with any of the previous embodiments, an angle between current data and data loaded from a user profile can be used to determine if the current user is the intended user.

In another embodiment, which can be combined with any of the previous embodiments, an angle between current data represented as a vector and data from a user profile represented as a vector from profile can used to determine if it is the correct user.

In another embodiment, which can be combined with any of the previous embodiments, matching an angle against a set threshold can be used to determine if the current user is the intended user.

In another embodiment, which can be combined with any of the previous embodiments, a deviation calculation can be used to determine if the current user is the intended user.

In another embodiment, which can be combined with any of the previous embodiments, a threshold interval can be specified that can be used to determine if the current user is the intended user.

In another embodiment, which can be combined with any of the previous embodiments, weighting can be used to enhance the accuracy of the evaluation.

In another embodiment, which can be combined with any of the previous embodiments, weights can be applied to individual tests depending on their importance.

In another embodiment, which can be combined with any of the previous embodiments, a deviation can be used to modify weights to enhance the accuracy of an evaluation.

In another embodiment, which can be combined with any of the previous embodiments, summing combined weighted data can be used as a representative of the user.

In another embodiment, which can be combined with any of the previous embodiments, evaluation of combined tests can be used to determine if the current user is the intended user.

In another embodiment, which can be combined with any of the previous embodiments, a Bayesian network can be used to evaluate combined tests.

In another embodiment, which can be combined with any of the previous embodiments, a threshold of the probability of the current user being the correct user can be specified that can be used to determine if the current user is the correct user.

In another embodiment, which can be combined with any of the previous embodiments, summing weighted data can be used to evaluate combined tests.

In another embodiment, which can be combined with any of the previous embodiments, a threshold can be specified that can be used to determine if the current user is the intended user.

Additional objects and advantages of the invention will be set forth in the description which follows, and in part will be obvious from the description, or may be learned by practice of the invention. The objects and advantages of the invention may be realized and obtained by means of the methods, processes, instrumentalities and combinations particularly pointed out in the appended claims.

BRIEF DESCRIPTION OF THE DRAWINGS

While the novel features of the invention are set forth with particularly in the appended claims, a complete understanding of the invention, both as to organization and content, and of the above and other features thereof may be gained from and the invention will be better appreciated from a consideration of the following detailed description of non-limiting embodiments presented hereinbelow with reference to the accompanying drawings, in which;

FIG. 2 is a flow chart of steps executed in a testing module.

DETAILED DESCRIPTION

Figure 1:
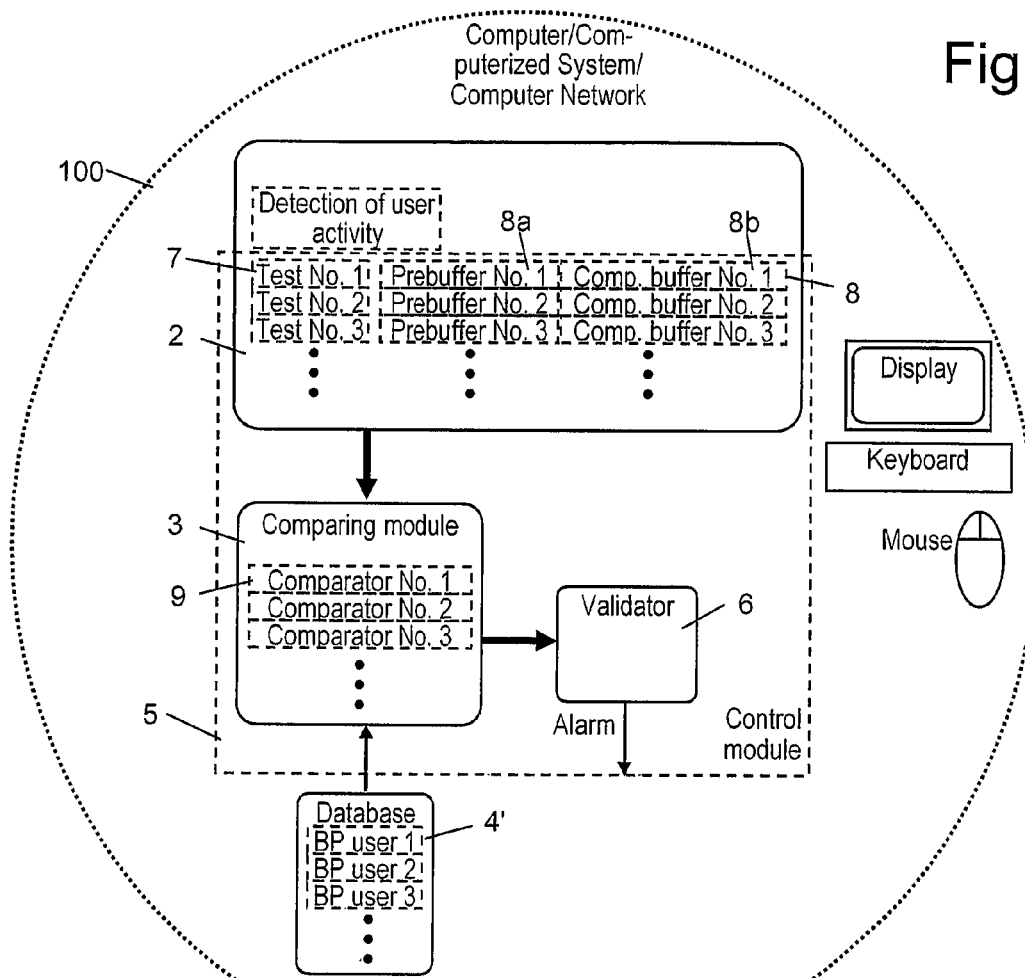
FIG. 1 is a block diagram of a security system for intrusion detection.

A person, e.g. an authorized or non-authorized user, can be assumed to interact with a computerized system with a unique set of behaviors. An example is that a user typically starts or closes programs or opens and closes data files in a specific manner. Another example of such a behavior is that a user may access programs with one speed of depressing keys on a keyboard in the morning and with a different speed at night.

FIG. 1 is a schematic showing main components of a security system 1 that is performing a security method or security process for supervising a computerized system 100, the components of the security system normally all themselves being components of the computerized system. Generally, a security system of kind described herein may require a module for detecting events in the computerized system such as a monitoring module 2, a database 4 for storing data of detected activity of users as behavior profiles in memory places 4' and a controller or control module 5. The behavior profiles thus reflect the history of the behavior of users. The control module may comprise a comparing module 3 and a validator or detection module 6 and additional modules or portions thereof if required. The modules are units that can be completely or partly embedded in each other. For instance the monitoring module 2 and the comparing module 3 may be embedded in each other as one unit. The functionalities and purposes of the comparing module 3 and the validator 6 may be handled in one single module. Many other combinations are possible. The modules can be parts of the computerized system or be completely or partly external thereof. For example some modules can located in an external device that for supervising is connected to the computerized system. Alternatively, only one or more of the functions of the modules can be executed in such an external device.

The computerized system 100 may be of many different types. In a simple case it is a stand-alone computer, terminal or workstation or a mobile device having computer facilities but it may of course also be a network of terminals, such as personal computers, workstations and mobile stations, of a company, an institute, a defense industry plant or some similar entity. The users of the computerized system typically communicate with each other and access services in the computerized system using conventional input- and output devices for electronic devices such as simple keys, keys arranged in keyboards, computer mice and display devices, not shown. In particular, the communication may involve graphical user interfaces shown on the display devices. The security system 1 and the corresponding security method may also be implemented to supervise a command based environment such as in a UNIX or LINUX command line based environment.

Thus, each of the behavior profiles is associated with a certain person, who can be a real life user of the computerized system or a log-in identity of a certain person. The behavior profile is established by basically detecting, such as by the monitoring module 2, activity related to the user that occur during a user session, i.e. during the time when the user is logging in to, is logged in to and is logging out of the computerized network 100. The detected activity or activities and the times when they occur is primarily evaluated in the comparing unit using data in the behavior profile of the respective user, accessed from the database 4, as a reference.

Test procedures performed in testing modules 7 running in the monitoring module 3 use predetermined behavior models for specific types of user interactions. Such a behavior model can include a single interaction or a sequence of user interactions. The testing modules 7 can use buffers 8 for storing statistical information, where the buffers can have a first buffer portion or prebuffer 8a and a second buffer portion or comparator buffer 8b. When such a buffer is full, in particular when the comparator buffer is full, it is sensed by the respective test procedure and signaled to a comparator 9 in the comparing module 3, which uses the content of the comparator buffer for comparing to corresponding information in the behavior profile of the logged-in user. If the correct user is detected when the result of all of the comparing operations performed by the comparators for the logged-in user, as decided by the validator 6, the information in the buffers containing the statistical data used in those comparing operations is used for updating the behavior profile of the logged-in user. If an incorrect user is detected those buffers are instead trashed and the security system 1 signals an alarm for incorrect user. The main steps taken by a testing module are illustrated in the flow chart of FIG. 2.

Start data for behavior profiles can be obtained by running the test procedures as described herein, only using the recorded data for collecting statistical data of the user behavior.

Examples of user activity and their evaluation will now be described. It is obvious to anybody skilled in the art that similar examples can easily be created based on the general principles described herein and hence that security system and security process as described herein may encompass all such specific examples.

The examples are described for a user that uses a computer or terminal running the operative system Microsoft Windows but it is obvious to anybody skilled in the art that the procedures as described can be applied for computers and terminals running any other operative system.

Listening to system events or more specifically user activities in a system running Microsoft Windows is done by the test procedures 7 that are all them time running in the monitoring module 2 and that use the Windows API for collecting information on user activity. All the test procedures 7 and comparators 9 run in a threaded environment and each pair of a test and a comparator has its own separate buffer 8. The buffer size is individually adjustable. In most cases a ring buffer may be used.

Example Key Rhythm

The user types a sequence of characters, for example depresses the keys for entering the letters Q, W, E, R and T.

The monitoring module 2 then detects events as appears from the following table. For each single event also the time when it occurs is recorded.

| Time | Key | Event |
|------|-----|-------|
| T0 | Q | Down |
| T1 | Q | Up |
| T2 | W | Down |
| T3 | W | Up |
| T4 | E | Down |
| T5 | E | Up |
| T6 | R | Down |
| T7 | R | Up |
| T8 | T | Down |
| T9 | T | Up |

Each of the test procedures 7 takes the data of each sequential event and analyzes it, if necessary using data of preceding events, to decide whether they belong to or are related to a behavior model of a special kind for which the test procedure and the associated comparator 9 are designed. If it is found that the data belong to the respective behavior model the data of the event, the data can be buffered into the first portion 8a of the associated buffer memory 8. The test procedure can detect when the first portion is full and if required, it may then calculate from the data in the first portion new data that are stored in the second portion 8b of the buffer, for example as data of an array.

The data in the above table can be relevant to a first test procedure 7.1. After the buffer portion 8a has been detected to be full, it calculates the time intervals between the key depressions (i.e. between the events with "Down" in the third column) and stores the following data as an array in the second buffer portion 8b:

[Q→W,(T2−T0)][W→E,(T4−T2)][E→
R,(T6−T4)][R→T,(T8−T6)]

After these data have been stored, it is signaled to the associated comparator 9.1 that now a comparing operation will be performed. The comparator retrieves the corresponding stored historical or statistical information for this sequence of events from the behavior profile of the logged-in user such as in the array

[Q→W,Ptime][W→E,Ptime][E→
R,Ptime][R→T,Ptime]

and compares it to the current content of the second buffer portion 8b. The comparing operation can be executed in any suitable way, for example using any the methods called HYPOTHESIS MATCHING, ANGLE MATCHING and DEVIATION MATCHING which will be described below. The result of the comparison is returned as the value true or false provided to the validator 6.

Example KEY PRESS

User types sequentially a plurality of characters and in this example the same events as in the example KEY FLIGHT are detected. The data for the detected events can be relevant to a second test procedure 7.2 that stores the data in the first buffer portion 8a. After this buffer portion has been detected to be full, the procedure calculates the time length of each key depression and stores the following data as an array in the second buffer portion 8b:

[Q,(T1−T0)][W,(T3−T2)][E,(T5−T4)][R,(T7−T6)]
[T,(T9−T8)]

After these data have been calculated and stored, the associated comparator 9.2 is activated. The comparator retrieves the corresponding stored historical or statistical information for this sequence of events from the behavior profile of the logged-in user such as in the array

[Q,Ptime][W,Ptime][E,Ptime][R,Ptime]

and compares it to the current content of the second buffer portion 8b as described above and returns an outcome value to the validator 6.

Example SEQUENCE CHECK

The user types a sequence of characters and in this example the same data as in the above examples FLIGHT are detected. The data for the detected events can be relevant to a third second test procedure 7.3. The data are stored in the first buffer portion and after it has been detected to be full, the procedure calculates the total time for entering the sequence and stores the following data as an array (in this case a single record) in the second buffer portion 8b:

[SEQ1,(T0−T8)]

After these data have been calculated and stored, the associated comparator 9.3 is activated to get the corresponding stored historical or statistical information from the behavior profile of the logged-in user such as in

[SEQ1,Ptime]

and compares it to the current content of the second buffer portion 8b as described above and returns an outcome value to the validator 6.

Example BUTTON STATISTICS

The user double-clicks using a mouse, not show, on an icon, not shown, in the desktop field shown on the monitor, not shown, of the user's terminal or computer.

The monitoring module 2 then detects events as appears from the following table. As above, for each single event also the time when it occurs is recorded.

| Time | Event |
|------|-------|
| T0 | Left Button Press (Coordinates) |
| T1 | Left Button Release (Coordinates) |
| T2 | idle |
| T3 | idle |
| T4 | Left Button Press (Coordinates) |
| T5 | Left Button Release (Coordinates) |
| T6 | idle |
| T7 | idle |

The data for the detected events can be relevant to a fourth test procedure 7.4. The data are stored in the first buffer portion 8a and after it has been detected to be full, the procedure calculates the total time between two consecutive clicks, e.g. only provided that the total time is below a threshold value, and the stores the following data as an array in the second buffer portion 8b:

[T0,(T5−T1)]

After these data have been calculated and stored, the associated comparator 9.3 is activated to get the corresponding stored historical or statistical information from the behavior profile of the logged-in user such as in

[T0,Ptime]

and compares it to the current content of the second buffer portion 8b as described above and returns an outcome value to the validator 6.

Instead of making the comparing directly after a detected double-clicking operation, the data from a plurality of double-clicking operations can be compared. Then the data of the detected events can be as follows:

| Time | Event |
|------|-------|
| T0 | Left Button Press (Coordinates) |
| T1 | Left Button Release (Coordinates) |
| T2 | idle |
| T3 | idle |
| T4 | Left Button Press (Coordinates) |
| T5 | Left Button Release (Coordinates) |
| T6 | idle |
| T7 | idle |
| . | |
| . | |
| . | |
| T20 | Left Button Press (Coordinates) |
| T21 | Left Button Release (Coordinates) |
| T22 | idle |
| T23 | idle |
| T24 | Left Button Press (Coordinates) |
| T25 | Left Button Release (Coordinates) |
| . | |
| . | |
| . | |
| Tn | Left Button Press (Coordinates) |
| Tn + 1 | Left Button Release (Coordinates) |
| Tm + 2 | idle |
| Tn + 3 | idle |
| Tn + 4 | Left Button Press (Coordinates) |
| Tn + 5 | Left Button Release (Coordinates) |

The calculated data will then be

[T0,(T5−T1)][ . . . ][Tn,(T(n+5)−T(n+1)]

and the data with which it is compared are

[T0;Ptime][ . . . ][Tn,Ptime]

Example MOVE DELAY

The user clicks the Windows Start button shown on the monitor or display of the user's terminal and begins to move towards the programs folder.

The monitoring module 2 then detects events as appears from the following table. As above, for each single event also the time when it occurs is recorded.

| Time | Event |
|------|-------|
| T0 | Left Button Press (Coordinates) |
| T1 | Left Button Release (Coordinates) |
| T2 | idle |
| T3 | idle |
| T4 | Begins to move (Coordinates) |
| T5 | Moves (Coordinates) |
| T6 | Moves (Coordinates) |
| T7 | Moves (Coordinates) |
| T8 | idle |
| T9 | idle |

The data for these detected events can be relevant to a fifth test procedure 7.5. The data are stored in the first buffer portion 8a and after it has been detected to be full, the procedure calculates the total time between two consecutive clicks, e.g. only provided that the total time is below a threshold value, and then stores the following data as an array in the second buffer portion 8b:

$$[T0,(T4-T1)][\ldots][Tn,(Tx-Ty)]$$

After these data have been calculated and stored, the associated comparator 9.5 is activated to get the corresponding stored historical or statistical information from the behavior profile of the logged-in user such as in $$[T0,Ptime][\ldots][Tn,Ptime]$$

Hence, in this case the second buffer will contain information for n consecutive mouse moves before the data therein are compared to those of the behavior profile.

[INTERPOLATION] where we apply a X*Y invisible grid over the screen can be used to defeat the problem with different resolutions on different workstations.

Example MOVEMENT STATISTICS

The user clicks the Windows Start button and begins to move, using the mouse, towards the programs folder.

The monitoring module 2 then detects events as appears from the following table.

| Time | Event | Coordinates (after move) |
|------|-------|--------------------------|
| T0 | Left Button Press | C0 |
| T1 | Left Button Release | C1 = C0 |
| T2 | idle | |
| T3 | idle | |
| T4 | Moves | C4 |
| T5 | Moves | C5 |
| T6 | Moves | C6 |
| T7 | Moves | C7 |
| T8 | idle | |
| T9 | idle | |
| T10 | Left Button Press | C10 |
| T11 | Left Button Release | C11 = C10 |
| T12 | idle | |

The data for these detected events can be relevant to a sixth test procedure 7.6. The data are stored in the first buffer portion 8a and after it has been detected to be full, the procedure calculates the total time between two consecutive clicks, e.g. only provided that the total time is below a threshold value, and the stores the following data as an array in the second buffer portion 8b:

$$[T0,C1][T4,C4[T5,C5][T6,C6][T7,C7[T10,C10]$$

From the coordinate information acceleration, velocity, distance and angle can be computed and used by the associated comparator 9.6 for comparing to corresponding historical information taken from the behavior profile.

The coordinate information can be standardized by e.g. using an interpolation method where an X*Y invisible grid is applied over the active displayed area of the monitor to handle the problem of different resolutions of the display.

Example DRAG STATISTICS

The user grabs a file in Microsoft Windows Explorer by clicking on an icon of the file and moves the icon to another location.

The monitoring module 2 then detects events as appears from the following table.

| Time | Event | Coordinates |
|------|-------|-------------|
| T0 | Left Button Press | C0 |
| T1 | idle | |
| T2 | Moves | C2 |
| T3 | Moves | C3 |
| T4 | Moves | C4 |
| T5 | Moves | C5 |
| T6 | idle | |
| T7 | Left Button Release | C5 |
| T8 | idle | |

The data for these detected events can be relevant to a seventh test procedure 7.7 storing the data or parts thereof in the first buffer portion 8a and after it has been detected to be full, the procedure makes calculations similar to those described in the examples MOVEMENT STATISTICS and MOVE DELAY and the associated comparator 9.7 also performs a corresponding comparing to historical information taken from the behavior profile.

Example TOPOGRAPHIC

In this example interpolation is used in which an invisible X*Y grid layer is applied over the visible display area dividing the visible area in a plurality of cells.

For every event that the mouse triggers within a cell, a value associated with that cell is increased. The grid can then be analyzed as a gray scale image using singular value decomposition.

The comparison towards can be done by for example using the method ANGLE MATCHING.

Example MOVEMENT EFFICIENCY

The user moves the mouse pointer from point A to point B on the displayed area but with a curve.

The monitoring module 2 then detects events as appears from the following table.

| Time | Event | Coordinates |
|------|-------|-------------|
| T0 | idle | |
| T1 | Moves | C1 = (1, 1) |
| T2 | Moves | C2 = (5, 11) |
| T3 | Moves | C3 = (10, 16) |
| T4 | Moves | C4 = (15, 19) |
| T5 | Moves | C5 = (20, 20) |
| T6 | idle | |

The most efficient way would have been:

| Time | Event | Coordinates |
|------|-------|-------------|
| T0 | idle | |
| T1 | Moves | C1 = (1, 1) |
| T2 | Moves | C2 = (5, 5) |
| T3 | Moves | C3 = (10, 10) |
| T4 | Moves | C4 = (15, 15) |
| T5 | Moves | C5 = (20, 20) |
| T6 | idle | |

One of the test procedures finds that the data matches its definition for determining data of movement efficiency and can then, after sufficient data has been received, calculate the extra distance that has been used and store a value thereof in the second buffer portion. Statistics about previous efficiency of the mouse movements can be used by the associated comparator to determine if it is the correct user.

Examples of matching algorithms that may be suitable will now be described.

ANGLE MATCHING

1. Get the data from the comparator buffer 8b into a vector u.
2. Fetch matching data from behavior profile of user into a vector v.
3. Calculate the angle between vector u and vector v according to $$\arccos\left(\frac{u \cdot v}{\|u\| \cdot \|v\|}\right)$$

4. Compare the angle to a dynamically set threshold of if is below the threshold the comparison is positive, i.e. it is the correct user, result value=true, and if the angle is above the given threshold the comparison is negative, i.e. it is probably an intruder, result vale=false.
5. Returns true or false.

DEVIATION MATCHING

1. Get the data from the comparator buffer into an array u.
2. Fetch matching data from behavior profile into an array v.
3. Calculate the deviation and the mean value from the values in array v.
4. Min value=Mean value−Deviation
5. Max value=Mean value+Deviation
6. Modify the threshold set for the respective comparing operation and the user by multiplying the calculated Deviation by a desired value.
7. Check that the values from array u is within the range given Min value and Max value. If the value is outside the boundaries it is probably not the correct user.
8. Returns true or false

HYPOTHESIS MATCHING

Using statistical hypothesis testing a null hypothesis is set that represents the true relationship that is known from the behavior profile, a test hypothesis is set representing the sample, then an appropriate significance level of for example 5% or 1% is chosen and then it can easily checked whether the test hypothesis is true with a high strength and a low risk of error.

One example of a possible algorithm performed by the validator 6 will now be described.

BAYESIAN EVALUATION

A Bayesian network is a graphical model that encodes probabilistic relationships among variables of interest. When used in conjunction with statistical techniques, the graphical model has several advantages for data analysis. One, because the model encodes dependencies among all variables, it readily handles situations where some data entries are missing. Two, a Bayesian network can be used to learn causal relationships, and hence can be used to gain understanding about a problem domain and to predict the consequences of intervention. Three, because the model has both a causal and probabilistic semantics, it is an ideal representation for combining prior knowledge (which often comes in causal form) and data.

The result from a Bayesian network can be tested against a threshold to determine if it is the correct user.

SUM EVALUATION and STATIC WEIGHTING and DYNAMIC WEIGHTING

Each comparator 9 has a static weight associated to it. For example:

| Comparator | Weight |
|---|---|
| 9.1 | 10 |
| 9.2 | 15 |
| 9.3 | 5 |
| 9.4 | 15 |
| 9.5 | 5 |

In dynamic weighting the static weights are manipulated in order to adjust them to the current user's characteristics. Dynamic weighting can be done by different means. A method to calculate how representative each comparator result is for each user can be executed by evaluating the statistical pattern density with it.

| Comparator | Weight | Modifier | New weight |
|---|---|---|---|
| 9.1 | 10 | 2 | 20 |
| 9.2 | 15 | 0.5 | 7.5 |
| 9.3 | 5 | 1 | 5 |
| 9.4 | 15 | 1 | 15 |
| 9.5 | 5 | 2.5 | 12.5 |

By using sum evaluation the results from all the comparisons are evaluated as a whole. For example:

| Comparator | Result | Weight |
|---|---|---|
| 9.1 | True | +20 |
| 9.2 | False | −7.5 |
| 9.3 | True | +5 |
| 9.4 | True | +15 |
| 9.5 | False | −12.5 | would give:

$$p = 20 + (-7.5) + 5 + 15 + (-12.5) = 20$$

If p is smaller then the threshold an incorrect user has been detected and this fact is signaled as described above. If p is equal or larger then the threshold, the correct user is detected. Then also, the contents of the second portions of the corresponding buffers are used for updating the behavior profile.

While specific embodiments of the invention have been illustrated and described herein, it is realized that numerous other embodiments may be envisaged and that numerous additional advantages, modifications and changes will readily occur to those skilled in the art without departing from the spirit and scope of the invention. Therefore, the invention in its broader aspects is not limited to the specific details, representative devices and illustrated examples shown and described herein. Accordingly, various modifications may be made without departing from the spirit or scope of the general inventive concept as defined by the appended claims and their equivalents. It is therefore to be understood that the appended claims are intended to cover all such modifications and changes as fall within a true spirit and scope of the invention. Numerous other embodiments may be envisaged without departing from the spirit and scope of the invention.

The invention claimed is:

1. A method of detecting whether a current user is or is not the same as an intended user of a device or of identifying a current user of a device, the method comprising:
   detecting interactions or activities of the user with or through the device;
   after having detected an activity, analyzing the activity to decide, based on recorded data of a previously detected activity, whether the detected activity belongs to a predetermined model of user behavior;

in response to determining that the activity belongs to the predetermined model, storing data of the activity in a buffer associated with said predetermined model;

analyzing the data stored in the buffer to determine whether sufficient data are stored in the buffer or whether the buffer is full;

in response to determining that there are sufficient data stored in the buffer or the buffer is full, using the data stored in the buffer for comparing to data in a behavior profile of a user; and in response to determining that the data stored in the buffer does not sufficiently agree with said data in the behavior profile, signal or indicate this result to cause an alarm to be generated or use the result for an evaluation whether the current user is or is not the same as the intended user or use the result for identifying the current user, and otherwise to discard the data stored in said buffer;

wherein the data recorded for a detected user activity always includes a timestamp of the detected activity when the detected activity occurred.

2. The method according to claim 1, further comprising calculating, after determining that there are sufficient data stored in the buffer or the buffer is full, using the data stored in the buffer to provide statistical data and using statistical data in comparing to data in the behavior profile.

3. The method according to claim 1, wherein the detected interactions or activities include user interactions using input devices of the device, the input devices including a keyboard or a computer mouse.

4. The method according to claim 1, wherein the detected interactions or activities include user interactions in which inputs are made assisted by a graphical user interface shown on a display of the device.

5. The method according to claim 1, wherein in comparing the data stored in the buffer is used for comparing to data in a plurality of different behavior profiles, each specific to a particular user, in order to allow identifying the user.

6. The method according to claim 1, wherein the user profile contains historical data recorded or obtained from previously detected activities of the intended user.

7. The method according to claim 1, wherein times for pressing and/or releasing keys on a keyboard or time intervals between pressing and/or releasing keys on a keyboard, for which data are stored in the buffer, are used for comparing.

8. The method according to claim 1, wherein the model behavior includes a sequence of keystrokes.

9. The method according to claim 1, wherein the model behavior includes data of input through or using a computer mouse, including clicks and movements of the computer mouse.

10. A system for detecting whether a current user is or is not the same as an intended user of a device or for identifying a current user of a device, the system comprising:

a monitoring module for detecting interactions or activities of the user with or through the device;

at least one testing module connected to the monitoring module, and being configured to, after the monitoring module has detected an activity, analyze the activity, the at least one testing module further being configured to based on recorded data of a previously detected activity, whether the detected activity belongs to a predetermined model of user behavior;

a buffer connected to the at least one testing module for storing data of the detected activity;

the at least one testing module further arranged to analyze the data stored in the buffer to determine whether sufficient data are stored in the buffer or whether the buffer is full, a comparator connected to said at least one testing module and the buffer for using, in response to the at least one testing module determining that there are sufficient data stored in the buffer or the buffer is full, the data stored in the buffer to compare to data in a behavior profile of a user and the comparator further arranged to signal or indicate, in response to the comparator determining that the data stored in the buffer does not sufficiently agree with or is not sufficiently in line with said data in the behavior profile, cause an alarm to be generated, or provide the result for an evaluation or validation whether the current user is or is not the same as the intended user or use the result for identifying the current user, and otherwise to discard the data stored in said buffer, wherein the data recorded, for a detected user activity, data that always includes a timestamp of the detected activity when the detected activity occurred.

11. The system according to claim 10, wherein the at least one testing module is arranged to process or calculate, after determining that there are sufficient data stored in the buffer or the buffer is full, the data stored in the buffer to provide processed or calculated data, and that the comparator is arranged to use said processed or calculated data in comparing to data in the behavior profile.

12. The system according to claim 11, wherein the buffer includes a comparator portion in which said processed or calculated data are stored.

13. The system according to claim 10, wherein the monitoring module is arranged to detect activities including user interactions derived from using input devices of the device, including using a keyboard or a computer mouse.

14. The method according to claim 10, wherein the monitoring module is arranged to detect activities including user interactions in which inputs are made assisted by a graphical user interface shown on a display of the device.

15. The system according to claim 10, wherein the comparator is arranged to use the data stored in the buffer for comparing to data in a plurality of different behavior profiles, each specific to a particular user, in order to allow identifying the current user.

16. The system according to claim 10, wherein a database for storing a user profile containing historical data recorded or obtained from previously detected interactions or activities of the intended user.

17. The system according to claim 10, wherein the comparator is arranged to use times for pressing and/or releasing keys on a keyboard or time intervals between pressing and/or releasing keys on a keyboard, for which data are stored in the buffer.

18. The system according to claim 10, wherein the at least one testing module is arranged to use a model behavior including a sequence of keystrokes.

19. The system according to claim 10, wherein the at least one testing module is arranged to use a model behavior including data of input through or using a computer mouse, including clicks and movements of the computer mouse.

20. The method according to claim 2, further comprising comparing statistical data computed from previously detected activities with stored statistical data using deviation and weightings for each individual test or comparison.

21. The method according to claim 20, further comprising performing combined tests, wherein the combined tests includes using a Bayesian network to evaluate combined tests.

22. The method according to claim 1, wherein detecting an activity includes detecting an activity in which inputs, made via a computer mouse, are standardized using an X*Y invisible grid applied over an active displayed area of a monitor; and further comprising using the detected activity as input data.

23. The method according to claim 1, wherein detecting an activity includes detecting an activity in which inputs are made via a computer mouse using a difference of a current path and a shortest path when the computer mouse is moved; and further comprising using the detected activities.

24. The method according to claim 1, wherein detecting an activity includes detecting an activity that includes consequences of user actions using a graphical user interface; and using the detected activity as input data.

25. The method according to claim 1, wherein analyzing the activity includes analyzing, in real time, the activity, thereby enabling an intrusion to be stopped while it is happening.

26. The method according to claim 1, wherein determining includes determining which predetermined model from a plurality of predetermined models the activity belongs; and wherein storing data of the activity includes storing the data of the activity in a buffer associated with said predetermined model from among the plurality of predetermined models the activity belongs; and further comprising using predetermined behavior models for specific types of user activities, including a sequence of user interactions, wherein the sequence of user interactions includes activities of different types that are stored in different buffers.

* * * * *